(12) United States Patent
Frahm et al.

(10) Patent No.: US 10,218,987 B2
(45) Date of Patent: Feb. 26, 2019

(54) METHODS, SYSTEMS, AND COMPUTER READABLE MEDIA FOR PERFORMING IMAGE COMPRESSION (71) Applicant: The University of North Carolina at Chapel Hill, Chapel Hill, NC (US)

(72) Inventors: Jan-Michael Frahm, Chapel Hill, NC (US); David Paul Perra, Marina Del Rey, CA (US)

(73) Assignee: THE UNIVERSITY OF NORTH CAROLINA AT CHAPEL HILL, Chapel Hill, NC (US)

(*) Notice: Subject to any disclaimer, the term of this patent is extended or adjusted under 35 U.S.C. 154(b) by 70 days.

(21) Appl. No.: 15/321,361

(22) PCT Filed: Jun. 30, 2015

(86) PCT No.: PCT/US2015/038489
§ 371 (c)(1),
(2) Date: Dec. 22, 2016

(87) PCT Pub. No.: WO2016/004006
PCT Pub. Date: Jan. 7, 2016

(65) Prior Publication Data
US 2017/0195678 A1 Jul. 6, 2017

Related U.S. Application Data

(60) Provisional application No. 62/018,829, filed on Jun. 30, 2014.

(51) Int. Cl.
*H04N 19/172* (2014.01)
*G06K 9/62* (2006.01)
(Continued)

(52) U.S. Cl.
CPC .......... *H04N 19/172* (2014.11); *G06K 9/622* (2013.01); *G06K 9/6215* (2013.01);
(Continued)

(58) Field of Classification Search
CPC ..... H04N 19/105; H04N 19/172; H04L 67/10
See application file for complete search history.

(56) References Cited

U.S. PATENT DOCUMENTS 8,711,248 B2 * 4/2014 Jandhyala ................ G06T 7/20
348/208.1
8,908,984 B2 * 12/2014 Carmel ................ H04N 19/176
375/240.13

(Continued)

FOREIGN PATENT DOCUMENTS

WO WO 2010/088840 A1 8/2010

OTHER PUBLICATIONS

Ait-Aoudia et al., "A Comparison of Set Redundancy Compression Techniques," EURASIP J. Appl. Signal Process., pp. 1-13 (Jan. 2006).

(Continued)

*Primary Examiner* — Tsion B Owens
(74) *Attorney, Agent, or Firm* — Jenkins, Wilson, Taylor & Hunt, P.A.

(57) ABSTRACT

Methods, systems, and computer readable media for performing image compression are disclosed. According to one exemplary method, the method includes identifying a canonical image set from a plurality of images uploaded to or existing on a cloud computing and/or a storage environment. The method also includes computing an image representation for each image in the canonical image set. The method further includes receiving a first image. The method also includes identifying, using the image representations for the canonical image set, one or more reference images (Continued)

that are visually similar to the first image. The method further includes compressing the first image using the one or more reference images.

19 Claims, 3 Drawing Sheets

(51) Int. Cl.
| | | |
|---|---|---|
| *H04N 19/105* | (2014.01) | |
| *H04N 19/503* | (2014.01) | |
| *H04N 19/136* | (2014.01) | |
| *H04L 29/08* | (2006.01) | |

(52) U.S. Cl.
CPC ......... *G06K 9/6276* (2013.01); *H04N 19/105* (2014.11); *H04N 19/136* (2014.11); *H04N 19/503* (2014.11); *H04L 67/10* (2013.01)

(56) References Cited

U.S. PATENT DOCUMENTS

| | | | | |
|---|---|---|---|---|
| 9,503,738 | B2* | 11/2016 | Carmel | H04N 19/176 |
| 2012/0201462 | A1* | 8/2012 | Chang | H04N 19/147 |
| | | | | 382/190 |
| 2013/0273968 | A1* | 10/2013 | Rhoads | G06F 17/30244 |
| | | | | 455/556.1 |
| 2014/0105463 | A1* | 4/2014 | Wang | G06T 7/2006 |
| | | | | 382/103 |
| 2015/0172669 | A1* | 6/2015 | Nishiyama | H04N 19/136 |
| | | | | 375/240.08 |

OTHER PUBLICATIONS

Andoni et al., "Near-Optimal Hashing Techniques for Approximate Nearest Neighbor in High Dimensions," Foundations of Computer Science, 2006. FOCS '06. 47th Annual IEEE Symposium, pp. 459-468 (Oct. 2006).
Doersch et al., "What Makes Paris Look Like Paris?" ACM Transactions on Graphics (SIGGRAPH), ACM, vol. 31, pp. 1-9. (2012).
Douze et al., "Evaluation of Gist Descriptors for Web-Scale Image Search," Proceedings of the ACM International Conference on Image and Video Retrieval, CIVR '09, pp. 1-8, (2009).
Frahm et al., "Building Rome on a Cloudless Day," EECV, vol. 6314, pp. 1-14 (2010).
Hays et al., "Scene Completion Using Millions of Photographs," ACM SIGGRAPH, vol. 26, No. 3, article 4, SIGGRAPH '07, pp. 1-8 (Jul. 2007).
Hays et al., "Im2gps: Estimating Geographic Information from a Single Image," IEEE Conference on Computer Vision and Pattern Recognition, pp. 1-8 (2008).
Lu et al., "Digital Photo Similarity Analysis in Frequency Domain and Photo Album Compression," Proceedings of the 3rd International Conference on Mobile and Ubiquitous Multimedia, MUM '04, pp. 237-244 (2004).
Meher et al., "Efficient Integer DCT Architectures for HEVC. Circuits and Systems for Video Technology," IEEE Transactions, 24(1) pp. 168-178 (Jan. 2014).
Nickolls et al., "Scalable Parallel Programming With Cuda," Queue Focus GPUs, 6(2), pp. 40-53 (Mar. 2008).
Oliva et al., "Modeling the Shape of the Scene: A Holistic Representation of the Spatial Envelope," International Journal of Computer Vision, 42(3), pp. 145-175 (2001).
Raginsky et al., "Locality-Sensitive Binary Codes from Shift-Invariant Kernels," NIPS, pp. 1509-1517 (2009).
Raguram et al., "Modeling and Recognition of Landmark Image Collections Using Iconic Scene Graphs," Int. J. Comput. Vision, 95(3), pp. 1-28 (Dec. 2011).
Shahine, "Over 250m People Using Skydrive," http://blog.onedrive.com/over-250m-people-using-skydrive/, pp. 1-3 (May 6, 2013).
Shanableh et al., "MPEG-2 to HEVC Video Transcoding with Content-based Modeling," Circuits and Systems for Video Technology, IEEE Transactions, 23(7), pp. 1191-1196 (Jul. 2013).
Shi et al., "Photo Album Compression for Cloud Storage Using Local Features," Emerging and Selected Topics in Circuits and Systems, IEEE Journal, 4(1), pp. 17-28 (Mar. 2014).
Smith, "Facebook Users are Uploading 350 Million New Photos Each Day," URL http://www.businessinsider.com/facebook-350-million-photos-each-day-2013-9, pp. 1-6 (Sep. 18, 2013).
Sullivan et al., "Overview of the High Efficiency Video Coding (HEVC) Standard," IEEE Trans. Circuits Syst. Video Techn., 22(12), pp. 1649-1668 (2012).
Wallace, "The jpeg still picture compression standard," Commun. ACM, 34(4), pp. 30-44 (Apr. 1991).
Yeung et al., "Compressing Similar Image Sets Using Low Frequency Template,". Multimedia and Expo (ICME), 2011 IEEE International Conference, pp. 1-6 (Jul. 2011).
Yue et al., "Cloud-Based Image Coding for Mobile Devices 2014—Toward Thousands to One Compression," Multimedia, IEEE Transactions, 15(4), pp. 845-857 (Jun. 2013).
Zou et al., "Personal Photo Album Compression and Management," Circuits and Systems (ISCAS), 2013 IEEE International Symposium, pp. 1428-1431 (May 2013).
Notification of Transmittal of the International Search Report and the Written Opinion of the International Searching Authority, or the Declaration for International Application No. PCT/US2015/038489 (dated Oct. 29, 2015).

* cited by examiner

METHODS, SYSTEMS, AND COMPUTER READABLE MEDIA FOR PERFORMING IMAGE COMPRESSION

RELATED APPLICATIONS

This application claims the benefit of U.S. Provisional Patent Application Ser. No. 62/018,829 filed Jun. 30, 2014; the disclosure of which is incorporated herein by reference in its entirety.

TECHNICAL FIELD

The subject matter described herein relates to data compression. More specifically, the subject matter relates to methods, systems, and computer readable media for performing image compression.

BACKGROUND

The advent of affordable consumer-grade digital cameras has caused the quantity of personal photographs to explode over the past two decades. Since then, consumers have been largely responsible for managing and maintaining their own personal photo collections. In recent years, cloud storage systems such as Google Drive, Microsoft OneDrive, and Facebook have gained popularity as convenient services for hosting personal media files. For example, recently Facebook revealed that its 1.15 billion users upload over 350 million new photos every day. As the size and number of photos continues to grow, hosting billions or trillions of photos will become a very expensive task for cloud platforms due to hardware, software, and power constraints. For example, it has been estimated that maintaining billions of photos in the cloud can cost tens of millions of dollars each year before even considering server power, cooling, space, and manpower. Thus, finding ways to minimize these rapidly increasing storage costs is a priority for any cloud service.

Accordingly, there exists a need for improved methods, systems, and computer readable media for performing image compression.

SUMMARY

Methods, systems, and computer readable media for performing image compression are disclosed. According to one method, the method includes identifying a canonical image set from a plurality of images uploaded to or existing on a cloud computing and/or a storage environment. The method also includes computing an image representation for each image in the canonical image set. The method further includes receiving a first image. The method also includes identifying, using the image representations for the canonical image set, one or more reference images that are visually similar to the first image. The method further includes compressing the first image using one or more reference images.

According to one system, the system includes a memory and an image compression module (ICM) implemented using a memory. The ICM is configured to identify a canonical image set from a plurality of images uploaded to or existing on a cloud computing environment and/or a storage environment, to compute an image representation for each image in the canonical image set, to receive a first image, to identify, using the image representations for the canonical image set, one or more reference images that are visually similar to the first image, and to compress the first image using the one or more reference images.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer cause the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

Preferred embodiments of the subject matter described herein will now be explained with reference to the accompanying drawing, wherein like reference numerals represent like parts, of which.

DETAILED DESCRIPTION

The subject matter described herein relates to methods, systems, and computer readable media for performing image compression. In the last few years, the number of images being stored in the "cloud" has dramatically increased and, similarly, the costs associated with storing such large number of images have also increased. Hence, finding ways to minimize rapidly increasing storage costs is a priority for any cloud service.

Image compression can be a viable option for minimizing storage costs associated with storing images. For example, a given image may be recomposed on a pixel or patch basis using several different photographs which have already been stored in the cloud. Personal photo collections are prime candidates for redundant pixel removal since they often depict the same subjects in common locations. Repeated pixel arrangements across multiple photographs can be identified and reused to prevent storing the same information multiple times. An extension of this idea is to utilize the big photo data on the web to find near-duplicates of a given photo, using the content found in the near-duplicate images to reconstruct the current photo.

In addition to personal photo collections, photo redundancy is especially prevalent in web-hosted datasets, which include specific monuments, landmarks, or frequently geotagged areas. Many 3D reconstruction techniques (e.g., methods, algorithms, and/or processes) use such datasets for precisely this reason [5]. These datasets tend to be prime candidates for large-scale image compression because they have an incredible amount of photos and may include many photos of the same general subjects and structures.

Conceptually, two images with high appearance redundancy can be seen as two subsequent video frames. Using this insight, image compression techniques may leverage efficient state of the art video compression methods, for example H.265 [18], or any other multi-image compression methods, all those compressions are collectively referred to as video compression or video codec. In fact, these techniques are implemented in hardware which can be found even in mobile phones.

For example, in one such scheme, each frame of an image sequence may be categorized as an I-frame, P-frame, or B-frame. The amount that each frame can be compressed is dependent upon the frame type. I-frames are compressed independently and can be recovered without information from other images in the sequences. P-frames and B-frames, on the other hand, can reference macroblocks of pixels in one or more reference images, respectively, in order to compress the image. As such, P-frames and B-frames can obtain higher compression rates than I-frames [15]. A balance must be struck between compression rate and visual quality; systems which are willing to accept small amounts of compression artifacts would be able to increase compression rates by changing the compression parameters of the video codec. For example, these parameters may be set to maintain the original (visual) image quality.

The challenge, then, is to find images which have sufficient visual similarity to allow a video compression format to maximize the bit savings and minimize the visual artifacts and the time taken to encode and decode each photo. To accomplish this, previously uploaded or existing photos in the cloud may be used as a canonical set of images, which can be used to compress the pixel data of future image uploads. This canonical image set is finite in size and may represent a majority of commonly photographed subjects. It should be noted that images found within the canonical set can also undergo compression themselves.

In accordance with some aspects of the present subject matter, an image compression technique (e.g., method, algorithm, and/or process) may utilize a canonical set of images comprising images uploaded to a cloud computing environment or a storage environment. For example, an exemplary image compression technique may receive a newly uploaded, uncompressed query image, and may find its most visually similar counterparts within the canonical set by performing a k-nearest neighbors (KNN) search over a binarized GIST representation of all photos [11]. Then, a video compression scheme, such as H.265, may be applied to neighbor-query image pairs, forcing each neighboring image from the canonical image set to be the I-frame in each two-frame video. Finally, the portion of the resulting bitstream may be saved, which corresponds to the query image (along with other metadata describing the canonical image that was used to compress the query image).

Techniques to remove redundant pixel data between images can be broken down into two classes: representative signal techniques [1, 20], and visual clustering techniques [8, 16, 22]. Representative signal techniques operate by first aligning a set of images and finding a low frequency signal to best describe each pixel. Then, each image is stored as a difference image between itself and the low-frequency signal. The compression rate for this class of technique is highly dependent upon the ability to align all images within the set. As such, it is more useful for images in the realms of medical and satellite imagery, which commonly have multiple accurate and photoconsistent images in a given image set.

Visual clustering techniques, on the other hand, do not require tight alignment between images. Instead, they focus on sharing and reusing pixel data between multiple images. Visual clustering techniques model the relationship between images as a directional graph. The nodes of the graph are either the images or a set of image representations, whereas the edges represent a quantifiable distance between the nodes (usually using local feature descriptor matching criteria). Following a path through this directional graph describes an image pseudosequence for use in image reconstruction [16, 21, 22]. Image reconstruction consists of one of the following: 1) the warping, correction, and combination of one or more reference images to produce a target image [16], or 2) the stitching and blending of one or more unwarped patches from different reference images to form a target image [21, 22]. Generally speaking, these pseudosequences act as chains of frames, which are used to create interdependent encodings and decodings to maximize bit savings [16]. Many recent visual clustering techniques require a set of local features to identify patches from different images that can be combined to form a target image. However, some techniques in large-scale image completion have reported success with creating directed graphs for images using GIST instead of local image descriptors [6]. Most of the visual clustering compression papers only compare their results to H.265 intra-coding but forgo the benefits of H.265 inter-coding [8, 22], which the present subject matter leverages. Shi et al. [16] claim that H.265 inter-coding outperforms H.265 intra-coding.

In most modern cloud storage systems, photos are saved as JPEG files [19]. One important reason why cloud storage systems haven't migrated to more memory efficient compression techniques is because random access is important to maintaining low latency access times for users. Due to alignment difficulties, representative signal techniques do not translate well to arbitrary photographs across multiple users. However, visual clustering techniques tend to be too slow and have too many decoding steps to provide random, on-demand access of any particular photo. By maintaining one-to-many correspondences between canonical images and query images, and by never compressing query images with photos outside of the canonical set, the time and complexity of multiple encoding and decoding steps may be avoided.

Systems which create and compress pseudosequences out of a single user's photos obtain high quality versus compression rates but are slow performers for compression and image serving. This is because psuedosequences are usually compressed with video codecs which assume that the images are causal and, thus, directional in time. Direct random access of a frame in a video compressed psuedosequence has high overhead because most frames in the pseudosequence will be P-frames or B-frames, and these frames are dependent upon the successful decoding of previous or future frames in the pseudosequence. Additionally, if geometric and photometric transformations need to be performed for each image decoding step then decoding a random image of an H.265 compressed image set will take a non-trivial amount of time to complete.

Zou et al. [22] attempt to manage and compress personal photo collections by building a minimum spanning tree (MST) out of the photo collection and using paths from the MST's root as compressible image pseudosequences. They define their similarity metric by an all pairs patch-wise SSD computation. Each image pseudosequence is then subject to H.265 compression. Their technique performs well for small photo sets, but the all-pairs nature of the technique does not allow for scalability. Additionally, focusing only upon individual users' photo collections does not allow use of the redundant data from other users' photo collections, which may contain more visually similar photos. In contrast, an exemplary technique in accordance with some aspects of the present subject matter leverages millions of pre-existing images in the cloud in order to pick the best candidate for H.265 compression. Building an MST may be avoided by compressing images using a large canonical image set, so an exemplary technique in accordance with some aspects of the present subject matter may be more robust to adding and removing photos; there are no album specific encoding or decoding dependencies generated by such an exemplary technique.

Most recently, Shi et al. [16] propose an image reconstruction technique whose image quality outperforms results produced by H.265 video compression on the same images. They achieve state of the art results and show robustness to small, sparse datasets with challenging geometric variations between images. However, if millions of users' photos are leveraged during compression, it is much more realistic to assume that a given photo has a visually similar neighbor in the canonical image set. This should drastically improve H.265's performance. Although an exemplary technique in accordance with some aspects of the present subject matter may be less robust to challenging photometric and geometric deformations, the exemplary technique may attempt to avoid these deformations altogether by taking full advantage of the sheer number of photos present in the cloud. This also reduces the run time of an exemplary technique in accordance with some aspects of the present subject matter by orders of magnitude.

Given that aspects of the present subject matter relate to an image compression technique that identifies a visually similar image or images out of millions or billions of existing photo uploads, brute-force local feature matching is impractical. Although Shi et al. [16] perform a clustering step to find visually similar images before performing local feature matching, their clusters can grow in an unconstrained manner. Additionally, Shi et al. [16] cluster based on SIFT descriptors which is not scalable by practical means since it bears high computational cost. On the other hand, Douze et al. [4] showed that GIST descriptors are an efficient and scalable choice for finding near-duplicate images in web-scale image sets. Frahm et al. [5] also showed that GIST is effective for performing viewpoint grouping based upon appearance clustering. For these reasons, it may be more efficient to represent all images as GIST descriptors for the purposes of finding near-duplicates of a query image from within a particular canonical image set.

Yue et al. [21] propose an image reconstruction technique which leverages local patches from more than one thousand images. Patches are mapped from a canonical set of 1491 images to various patches on the query image by using large-scale SIFT matching. While their technique produces excellent visual results, their local feature extraction and matching operation is far too expensive to allow the technique to scale. Additionally, such a small canonical set severely limits the number of photos that they can reconstruct. Their technique fails if no visually similar photos exist since a lack of similar pixel patches prevents target image reconstruction, whereas the compression rate of an exemplary technique in accordance with some aspects of the present subject matter gracefully degrades under the same circumstances. Moreover, using GIST over SIFT may allow matching a query image to visually similar images within a large canonical set, improving scalability.

In some embodiments, an exemplary technique in accordance with some aspects of the present subject matter may efficiently compress a user's photos at cloud-scale by reusing similar image data that already exists in the cloud (e.g., a canonical image set). In the following sections, how to obtain a canonical set and how it can be leveraged for cloud-scale image compression are discussed. For example, a single canonical set may be built and utilized for a single geographic region. In another example, multiple canonical sets may be used for multiple geographic regions by using input image geotag metadata or by inferring geographic information from the input image's contents [3, 7].

It is assumed that many photographs uploaded to the cloud are highly likely to have similar pixel patches, especially near landmarks and other commonly geotagged areas—even within the home of the user. As such, a canonical set may be a randomly selected, finite set of photos that is composed of tens or hundreds of millions of images depicting commonly photographed subjects and/or structures. Constructing such a set can be done, for example, by randomly sampling all photos currently stored in the cloud. Alternatively, techniques like Frahm et al. [5] and Raguram et al. [13] can be used to construct such a canonical set through iconic scene graphs. This process should naturally yield many views of popular subjects as more photos of those subjects are uploaded to the cloud. A sufficiently large canonical set contains enough photos to have a visually similar image for a large majority of photos uploaded in the future. In some embodiments a general canonical set may be supplemented with a user-specific canonical set if desired.

One important detail observed by Hays et al. [6] is that, because GIST does not encode high-level semantic information, a sufficiently large canonical image set must be used in order to allow visually similar images to be consistently returned during a visual similarity search. Their empirical results show that significant amounts of data enables GIST to perform well as a mechanism to find visually similar images. In short, larger canonical image sets will contain visually similar images with higher probability at the expense of slightly longer search times. Note that it has been empirically observed that, even with the search time increase, search times for a visually similar image are dwarfed by the time taken to execute H.265 on the frames.

An initial construction of a canonical image set may not contain visually similar images for all future queries. Picking an entirely new, larger canonical set is impractical as it would require many images to be recompressed against new canonical images. Even if the current image upload rates remained constant, this would be computationally prohibitive and likely cause further degradation of image quality. As such, various methods may be utilized for growing a pre-existing canonical set in a controlled manner while still maximizing the bit savings.

One promising way of growing the canonical set is to make a best-effort attempt at compressing all query images and then analyze each query image's resulting compression rate. If the compression rate is not high enough then that query image could be added to the canonical set and used as a potential reference image for future uploads. Alternatively, it may be the case that several new image queries do not compress well. In this scenario, it may be worthwhile to add one or more iconic images from this set of new image uploads to the canonical set; this iconic image could then be used as an I-frame in another query photo's compression.

In some embodiments, methods, techniques, and/or mechanisms may be utilized for finding a visually similar image in a canonical set. Given a recently uploaded image, Q, retrieve the k most visually similar images, $N_k$, from the canonical image set, C. To do this, a technique may preprocess the canonical data set in order to allow for a very fast k-nearest neighbors (KNN) query. The technique may compute a GIST representation of each image of the canonical set in parallel using a CUDA-optimized GIST implementation [10]. Still, storing a 368-float GIST descriptor for every element of the canonical set, C, is not memory efficient when handling multiple millions of images. Additionally, when performing a KNN operation, it's important to fit as many GIST descriptors into GPU-memory as possible in order to minimize the computation time. In some embodiments, a technique may compress the GIST descriptors through a binarizing process using a locality sensitive scheme [2, 12]. For example, each GIST descriptor may be reduced to a 512 bit binarized string. In this example, a 512 bit feature vector may be selected because it has been shown to produce a good balance between descriptor size and discriminative ability [5].

After precomputing all binarized GIST descriptors for the elements in the canonical set, C, the technique can perform KNN on the query image, Q. The technique may compute the query image's 512 bit binarized GIST representation and use it to find its nearest neighbors among the binarized GIST descriptors of the images in the canonical set. The KNN output will describe a set of images from the canonical set, which are visually similar to the query image, $N_k$. The nearest neighbors may be near-identical to the query image. Each of these k most visually similar images will be used to compress the query image by use of a video codec, as described in subsection 3.3.

To combat the issues associated with compressing and decompressing images using long pseudosequences, all photos in the canonical set may be required to act as I-frames (frames which only require intra-coding) for the H.265 compressed output. This allows all images in the canonical set to remain disjoint. Then, when a query image Q finds its visually nearest neighbor N from within the canonical set, C, the nearest neighbors $N_k$ will act as an I-frame and the query image Q will act as a P-frame. This establishes a one-to-many correspondence between images in the canonical set and query images and prevents query images from becoming dependent upon images not in the canonical set.

In some embodiments, various compression techniques, including but not limited to an H.265 codec, may be usable for performing image compression, e.g., on a large set of cloud-based images. For example, different types of video compression schemes (although results will vary based on the individual parameters of those compression schemes) may be utilized for compressing one or more images of a set of images.

In some experiments involving aspects of the subject matter described herein, a canonical set of approximately 13 million random images of London, which were downloaded from Flickr, is used. No particular size, data, or content constrains were placed on the downloaded photos. Indeed, noise in the dataset can exist through mislabeled or mistagged photos. However, because the canonical set is generated using randomly sample images of London, noise in the dataset will not have a significant impact upon results. The canonical set is preprocessed as described in Section 3.2. A gaming PC was used to conduct all of the following experiments, and all code (both KNN and compression) was parallelized and multi-threaded in order to maximize compression throughput.

In some embodiments, images returned by the KNN operation may not be guaranteed to be the same size or aspect ratio as the query image. Under these circumstances, each codec may resize and/or rescale the KNN images to make them the same size as the query image.

In some embodiments, the efficiency of KNN over large canonical set can be observed. For example, in one experiment, a k-nearest neighbor operation may be analyzed over the binarized GIST descriptors of the canonical image set, C. The goal of this experiment is to determine how large k must be to allow the KNN operation to return a visually similar image, maximizing the compression rate of a query image.

In some embodiments, the number of retrieved nearest neighbors, k, are varied in order to evaluate how the compression results change and to determine how many nearest neighbors must be returned before the most similar image in the canonical set is found. For each trial, each query image (7665 total) may be compressed with each of its k-nearest neighbors by using H.265 compression and then record the total elapsed time as well as the peak signal-to-noise ratio (PSNR) and the best compression rate for each photo. The results are provided in Table 1. The results show that the nearest neighbor generated by the KNN operation is typically the most visually similar image from the canonical set. Seeking out additional neighbors above k=1 produces diminishing returns, allowing for a small percentage of additional compression at the expense of significantly higher run-times. This experiment shows that small values of k are sufficient when focusing upon compression speed and scalability while maintaining high image quality.

TABLE 1

Comparing Different Values of k in KNN

| | k = 1 | k = 4 | k = 9 |
|---|---|---|---|
| Average PSNR | 40.46 | 40.0 | 40.2 |
| Average Bit Savings (% size reduction) | 74% | 76.0% | 76.5% |
| Time per Image (seconds) | 0.19 | 0.65 | 1.5 |

As indicated in one experiment, performance comparisons can made between an exemplary technique in accordance with some aspects of the present subject matter and other state-of-the-art techniques. To demonstrate the scalability of the exemplary technique, query images may include 76,526 images that are not a part of the canonical set.

Table 2 shows how the exemplary technique performs with respect to the works of Shi et al. [16], Zou et al. [22], and Yue et al. [21]. The timings presented in Table 2 are end-to-end times starting with the query image submission, the KNN operation, the compression, and the final image recovery after decoding. Timings depicted for the exemplary technique also include the decoding and PSNR measurements; the competing techniques made no mention of whether they measured PSNR as a part of their reported timings. For each query image, the three nearest neighbors are found in order to strike a balance between speed and compression efficiency. No code was made publicly available for the competing techniques so the run-times presented in Table 2 are the same as those reported in their respective publications.

In some embodiments, an exemplary technique using aspects (e.g., compressing an image using a reference image from a canonical image set, where the reference image is identified using a KNN search and binarized global image representations) of the present subject matter may scale to operate upon tens thousands of query images while achieving orders of magnitude more efficient run-times and competitive compression rates. Because the other techniques [16, 21, 22] use all-pairs local feature matching in order to establish relationships between the images, their run-times would be significantly worse if they had been subject to larger datasets—especially if the datasets were composed of millions of images like ours.

TABLE 2

Comparison to State-of-the-art Techniques

|  | TECHNIQUE | [16] | [22] | [21] |
|---|---|---|---|---|
| Canonical Set Size | 13,000,000 | 7 | 150 | 1,491 |
| Images Compressed | 76,526 | 7 | 150 | 10 |
| Average PSNR | 40.4 | 39 | 38.5 | 21.32 |
| Average Bit Savings (% size reduction) | 74% | 96% | 75% | 81.5% |
| Time per Image (seconds) | 0.17 | 256 | 8 | >10 |

As indicated in various experiments, the act of minimizing the canonical set may be highly dependent upon the compression goals for the canonical set. For example, an "ideal" canonical set may be composed of exactly the number of images needed to represent all possible input photo appearances. In practice, this kind of canonical set is impossible to construct. Instead, the canonical set should be focused upon approximating the "ideal" canonical set as best as possible. Hence, a third experiment aims to explore the question "How small of a canonical set can be used in practice?".

In the third experiment, results presented in Section 4.2 are compared to results obtained from two smaller canonical sets (one of size 500,000, and another of size 3,000,000, both of which consist of randomly chosen images of London). The nearest neighbor for each query image is found from the reduced canonical set and is used to carry out the compression described in Section 3. Each canonical set is evaluated by using tens of thousands of query images. As depicted in Table 3, results suggest that the size of the canonical set does not affect the compression results as much as one would intuitively believe. For example, reducing the canonical set a factor of 24 only reduced the compression rate by 11 percent. However, the execution time for the compressions dropped by 29.4% and the overall size of the canonical set was approximately 24 times smaller. Hence, systems which require faster compression timings or which may constrain the size of the canonical set can still use aspects of the present subject matter to great effect.

As the canonical set shrinks, time per image decreases and compression rate gracefully degrades. Note that the time per image does not decrease linearly since the H.265 operations are the bottleneck; fortunately, this bottleneck can be eliminated by employing commercially available H.265 compression hardware [9].

It should be noted that there is a theoretical limit to how small the canonical set can become before compression decays to an unacceptable level for an exemplary technique in accordance with some aspects of the present subject matter. To reiterate, smaller canonical sets imply sparser sampling of the domain of the representation, e.g. GIST descriptor. Hays et al. [6] independently observed that KNN over GIST descriptors degrades quickly as the number of samples decreases. It should be noted that, even under these unexplored circumstances, compression will still degrade gracefully and the image quality of the compressed image would not be impaired.

TABLE 3

Comparing Different Canonical Set Sizes

| Canonical Set Size | 13,000,000 | 3,000,000 | 500,000 |
|---|---|---|---|
| Average PSNR | 40.4 | 40.3 | 40.2 |
| Average Bit Savings (% size reduction) | 74% | 69% | 63% |
| Time per Image (seconds) | 0.17 | 0.15 | 0.12 |

Various image compression techniques, which are capable of reducing redundant image data in a cloud computing and/or storage environment by leveraging previously uploaded/existing photos, and other aspects associated with image compression are disclosed herein. Unlike previous techniques, which use exhaustive all-pairs local feature matching in order to identify images with similar visual qualities, one exemplary technique described herein may represent images as high-dimensional points by using binarized GIST descriptors. These binarized GIST descriptors lend themselves to an efficient GPU-enabled k-nearest neighbors implementation which can quickly identify visually similar photos within a canonical set of millions of images. For example, an exemplary technique in accordance with some aspects of the present subject matter can provide competitive compression rates and can identify and remove duplicate pixel information at significantly higher speeds that enable online operation of an image compression system at cloud-scale.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
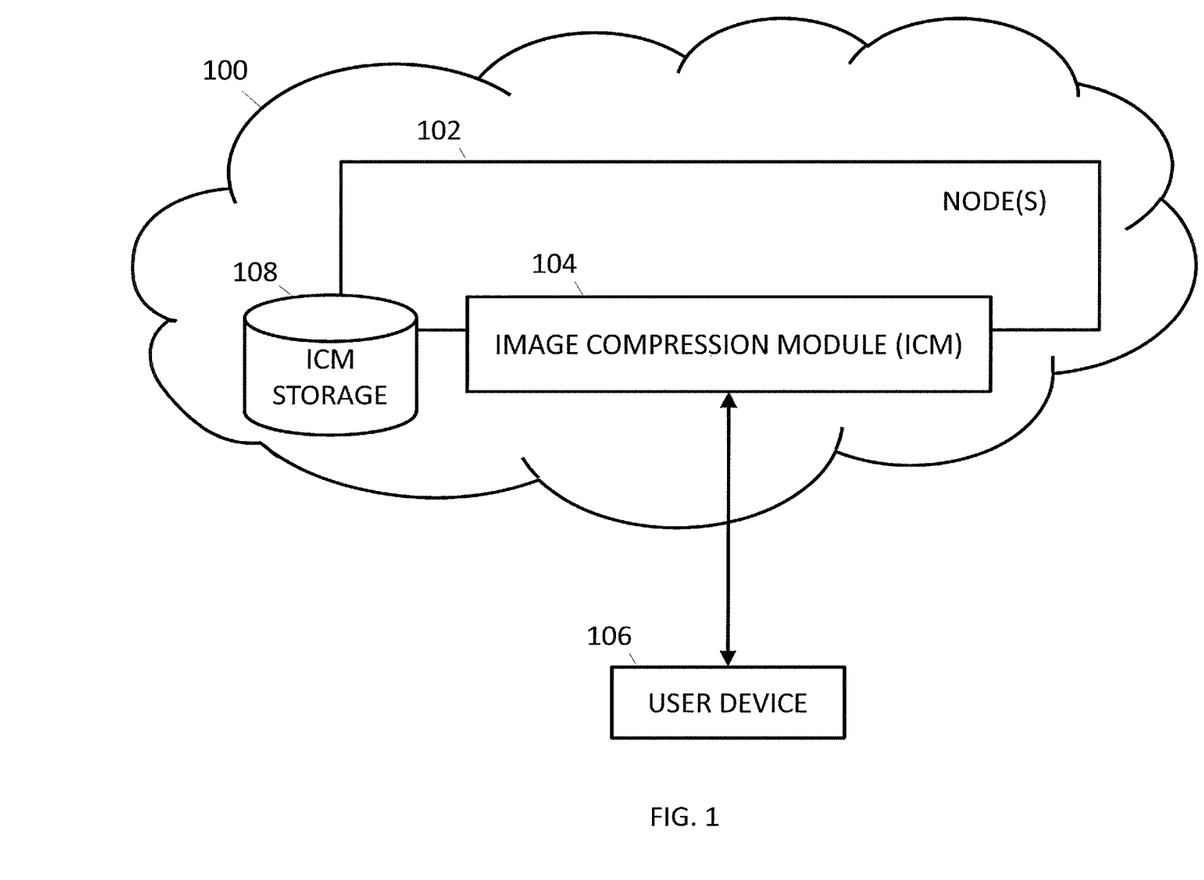
FIG. 1 is a diagram illustrating an environment for performing image compression according to an embodiment of the subject matter described herein.

FIG. 1 is a diagram illustrating a cloud computing environment 100 (e.g., one or more computing platforms or devices) for performing one or more aspects associated with image compression according to an embodiment of the subject matter described herein. Referring to FIG. 1, a cloud computing environment 100 may represent a computing platform or group of computing platforms, such as servers, connected through a communication network such as the Internet, an intranet, a local area network (LAN), and/or a wide area network (WAN). In some embodiments, cloud computing environment 100 may include one or more computing platforms that use virtualization or related resources, such as a virtual machine or virtual node. Cloud computing environment 100 and/or entities therein may be utilized to perform various tasks, functions, or services. In some embodiments, cloud computing environment 100 may include or act as a cloud storage environment. For example, cloud computing environment 100 and/or entities therein may be utilized for storing billions of images and other media for millions to billions of users across the world.

Cloud computing environment 100 may include node(s) 102 for performing one or more aspects associated with cloud-based storage and/or other services. Node(s) 102 may be any suitable entity or entities, such as a computing device, a processor, a virtual machine, or multiple computing platforms, for performing one or more aspects associated with image compression. For example, node(s) 102 may utilize one or more image compression techniques for compressing an image using a canonical image set comprising images uploaded to or existing on a cloud computing environment 100. In some embodiments, components, modules, and/or portions of node(s) 102 may be implemented or distributed across multiple devices, virtual machines, or computing platforms.

Node(s) 102 may include an image compression module (ICM) 104 and an ICM storage 108. ICM 104 may be any suitable entity or entities (e.g., software executing on a processor, a field-programmable gateway array (FPGA), an application-specific integrated circuit (ASIC), or a combination of software, an ASIC, or an FPGA) for performing one or more aspects associated with image compression. Exemplary aspects associated with image compression performable by ICM 104 may include receiving an image, identifying one or more reference images, and/or compressing the received image using the one or more reference images.

In some embodiments, node(s) 102 and/or ICM 104 may include multiple processors, such as graphics processing unit (CPUs). Each processor may represent any suitable entity (e.g., a physical processor, an ASIC, or an FPGA) for performing one or more aspects associated with image compression. For example, ICM 104 or software therein may be executable by one or more processor cores 108.

In some embodiments, ICM 104 may include functionality for receiving or sending information from or to various entities. For example, ICM 104 may include one or more communications interfaces for receiving or sending images or other data from or to ICM storage 108, node(s) 102, and/or other entities associated with cloud computing environment 100.

In some embodiments, ICM 104 may provide a communications interface for communicating with user device 106. User device 106 may be any entity (e.g., a computing platform, a mobile phone, or a tablet computer) for communicating with ICM 104 and/or another entity in cloud computing environment 100. For example, various user interfaces (e.g., an application user interface (API) and a graphical user interface (GUI)) may be provided for sending or uploading an image to a cloud storage service. Exemplary user interfaces for communicating with ICM 104 or other entities may support automation (e.g., via one or more scripting languages), a representation state transfer (REST) API, a command line, and/or a web based GUI.

In some embodiments, ICM 104 may include functionality for identifying and/or configuring a canonical image set (e.g., any group of images usable as reference images for image compression purposes). For example, ICM 104 may randomly sample millions of images from one or more cloud storage services and/or their users to use for a canonical image set. In this example, ICM 104 may include a processor, an FPGA, or ASIC configured to generate or compute one or more image representations (e.g., GIST descriptors or global image descriptors) associated with images in the canonical image set. Continuing with this example, ICM 104 may compress the image representations, e.g., using one or more binarizing and/or hash operations.

In some embodiments, ICM 104 may be configured to identify a canonical image set and/or generate related image representations prior to receiving an image to be compressed, e.g., during a setup or initialization period of ICM 104. In some embodiments, ICM 104 may be configured to identify a canonical image set and/or generate related image representations on as-needed basis, e.g., utilizing parallel processing and/or multiple nodes, processors, GPUs, or other equipment). In some embodiments, after identifying a canonical image set and/or generating related image representations, ICM 104 may store the information in ICM storage 108, e.g., for future use.

In some embodiments, ICM 104 may include functionality for generating an image representation for a received image. For example, ICM 104 may include a processor, an FPGA, or ASIC configured to generate an image representation associated with a received image. In this example, ICM 104 may compress the image representation, e.g., using the same binarizing and/or hash and/or compressing operations used for compressing image representations for a canonical image set.

In some embodiments, ICM 104 may include functionality for determining or identifying one or more images from a canonical image set that are visually similar to a received image, e.g., from user device 106. For example, ICM 104 may be configured to perform a KNN search operation and/or another operation for searching image representations associated with a canonical image set. In this example, ICM 104 may identify images in the canonical image set that are associated with image representations that are similar to an image representation associated with a received image. In another example, ICM 104 may use metadata associated with images in a canonical image set and/or metadata associated with a received image for identifying visually similar images.

In some embodiments, ICM 104 may include functionality for compressing a received image using one or more compression techniques. Exemplary compression techniques may include video compression codecs, such as an H.265 codec or an MPEG-4 codec. In some embodiments, ICM 104 may be configured to utilize one or more reference images from a canonical image set for compressing a received image. For example, ICM 104 may store reconstruction information usable to reconstruct (e.g., recreate or substantial recreate) a received image by using one or more reference images. In this example, instead of storing the received image in its original (e.g., uncompressed) form, ICM 104 may store the reconstruction information and one or more tags or pointers identifying the one or more reference images, where such information may be substantially smaller (e.g., in bit or byte size) than the original (e.g., uncompressed) received image.

In some embodiments, ICM 104 may include functionality for managing compressed images, a canonical image set, and/or related data. For example, ICM 104 may include a management module for ensuring that if an image associated with a canonical image set is deleted (e.g., by a user), any images previously compressed using the deleted image can be recovered, reconstructed, and/or recompressed using different images from the canonical image set. In this example, the management module may be configured to store or maintain "deleted" images for image reconstruction purposes and/or for maintaining the canonical image set's validity or completeness. In another example, a management module may be configured to, prior to deleting an image associated with a canonical image set, reconstruct each image that uses the image to be deleted for compression purposes. In this example, ICM 104 and/or the management module may recompress the reconstructed images using one or more different images associated with the canonical image set.

ICM storage 108 may be any suitable entity (e.g., random access memory (RAM), physical disks, magnetic tape, or flash memory) for storing images, image representations, metadata, and/or other information. Various entities, such as node(s) 102, ICM 104, or other entities in cloud computing environment 100, may access (e.g., read from and/or write to) ICM storage 108. In some embodiments, ICM storage 108 may be located at node(s) 102, another node, or distributed across multiple computing platforms or devices in cloud computing environment 100. For example, ICM storage 108 may represent a distributed database system capable of storing images and/or other information across multiple storage devices.

It will be appreciated that FIG. 1 is for illustrative purposes and that various nodes, their locations, and/or their functions may be changed, altered, added, or removed. For example, ICM 104 and/or functionality therein may be performed by user device 106. In another example, some nodes and/or functions may be combined into a single entity or some functionality (e.g., in ICM 104) may be separated into separate nodes or modules.

Figure 2:
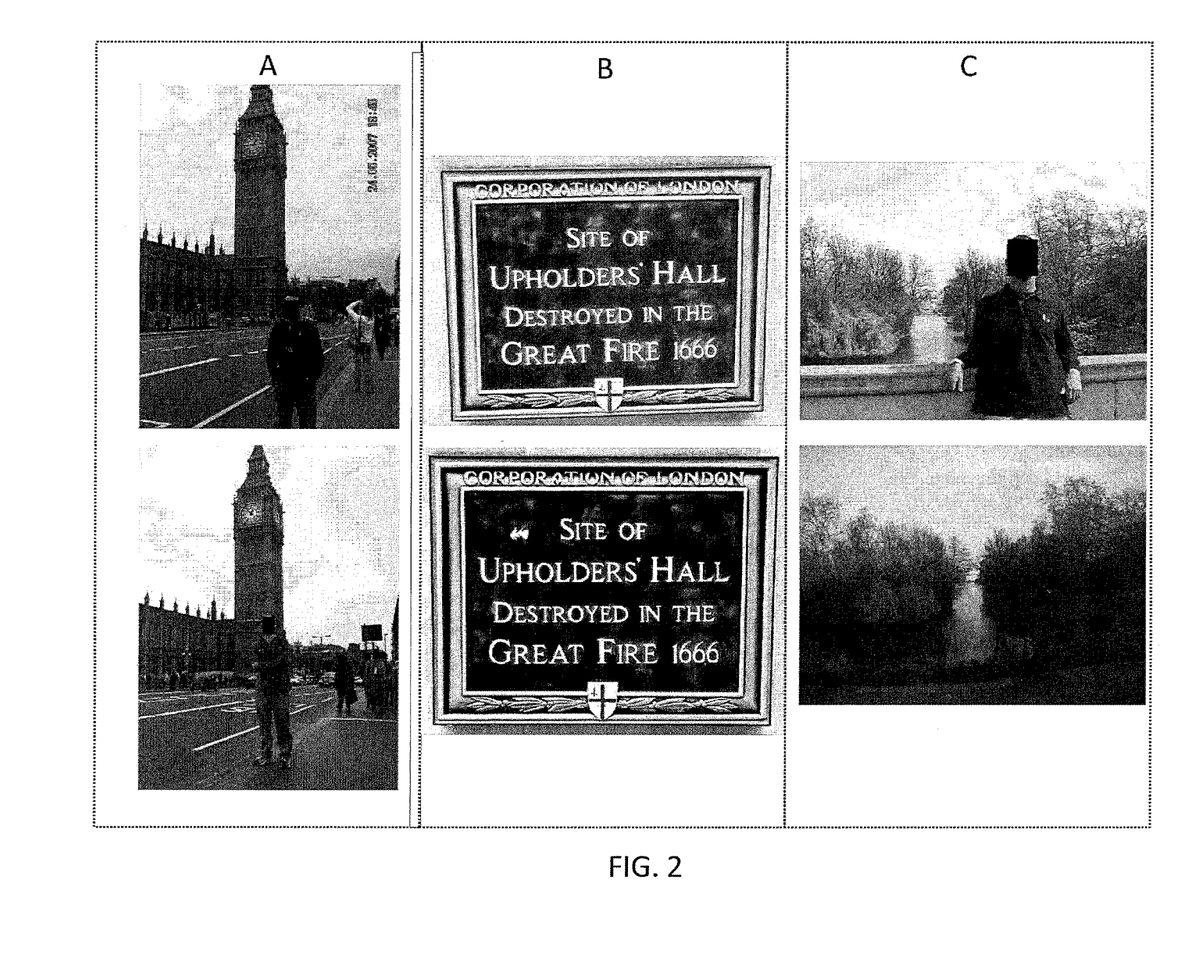
FIG. 2 includes example images associated with image compression according to an embodiment of the subject matter described herein.

FIG. 2 includes example images associated with image compression according to an embodiment of the subject matter described herein. In FIG. 2, image groups A, B, and C are depicted. Each image group includes a query image (located on top) and a query image's nearest neighbor (located on bottom) returned from a canonical set of images. In image group A, a query image may depict a subject standing in front of Big Ben, a famous landmark in London, England. Using a KNN algorithm leveraging a binarized GIST descriptor, a nearest neighbor image for the query image may be identified and may depict a different subject standing in front of Big Ben, albeit from a slightly different angle and/or perspective. In image group B, a query image may depict a plaque commemorating the site of Upholders' Hall. Using a KNN algorithm leveraging a binarized GIST descriptor, a nearest neighbor image for the query image may be identified and may depict the plaque commemorating the site of Upholders' Hall with a slightly different angle and/or perspective than the query image. In image group C, a query image may depict a subject and a river as a backdrop. Using a KNN algorithm leveraging a binarized GIST descriptor, a nearest neighbor image for the query image may be identified and may depict a similar backdrop without a subject.

Figure 3:
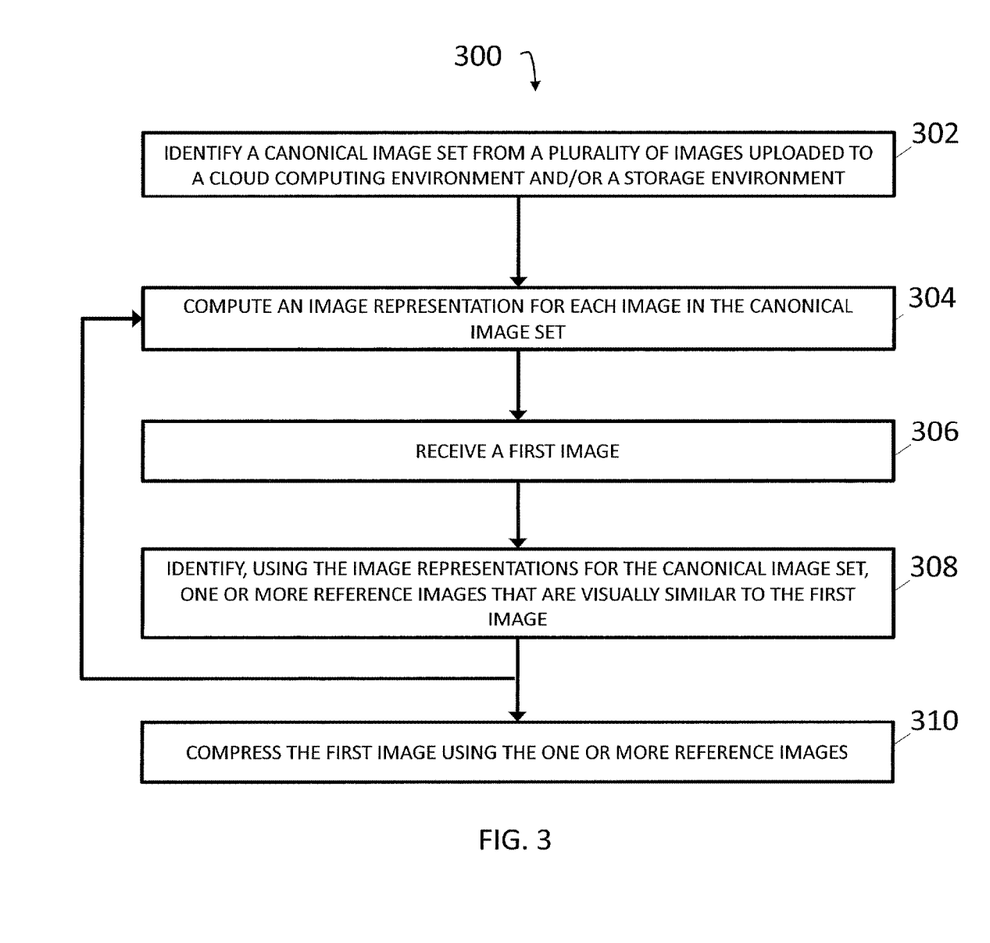
FIG. 3 is a diagram illustrating a process for performing image compression according to an embodiment of the subject matter described herein.

FIG. 3 is a diagram illustrating a process 300 for performing image compression according to an embodiment of the subject matter described herein. In some embodiments, process 300, or portions thereof, may be performed by or at node(s) 102, ICM 104, and/or another node or module. For example, node(s) 102 and/or ICM 104 may include a server or a virtual machine associated with cloud computing environment 100. In another example, ICM 104 may include functionality at user device 106, e.g., an FPGA or chip in a smartphone.

Referring to process 300, in step 302 a canonical image set may be identified from a plurality of images uploaded to or existing on a cloud computing environment 100 and/or a storage environment. For example, one hundred million images of various landmarks in Paris, France may be identified for a canonical image set. In this example, the one hundred million images may be of various sizes and resolution and may be from millions of users of Flickr and/or another cloud storage service.

In some embodiments, identifying a canonical image set may include randomly sampling images uploaded by or belonging to the different users.

In some embodiments, a canonical image set may include images uploaded by or belonging to different users.

In some embodiments, a canonical image set may include one or more compressed images.

In step 304, an image representation may be computed for each image in the canonical image set. For example, a GPU or group of GPUs associated with ICM 104 may generate GIST descriptors using a GIST related algorithm for images in a canonical image set.

In some embodiments, computing an image representation for each image in the canonical image set may include computing an image representation for each image in the canonical image set prior to identifying the one or more reference images.

In some embodiments, an image representation may include attributes for color, texture, shape, motion, or location associated with a depicted scene.

In some embodiments, an image representation may include a GIST descriptor represented as a binarized string.

In step 306, a first image may be received. For example, user device 106 may send or upload an image to node(s) 100. In this example, node(s) 100 may send the image to ICM 104 for image compression and/or other processing.

In step 308, one or more reference images that are visually similar to the first image may be identified using the image representations for the canonical image set. For example, ICM 104 may compare an image representation associated with a received image with image representations associated with a canonical image set. In this example, ICM 104 may select one or more images from the canonical image set that has similar image representations as the image representation associated with the received image.

In some embodiments, determining one or more reference images may include computing a first image representation for a first image, compressing the first image representation using a binarizing process, and performing, using the first image representation, a KNN search over the image representations for the canonical image set.

In step 310, the first image may be compressed using the one or more reference images. For example, ICM 104 may be configured to use a video compression technique, e.g., H.265, for storing information about a received image such that the received image can be substantially recreated using the stored information about the received image and one or more reference images. In this example, the stored information about the received image may be significantly smaller in size compared to the original, uncompressed version of the received image.

In some embodiments, compressing an image using one or more reference images may include using a first reference image to compress a first portion of the image and using a second reference image to compress a second portion of the image. For example, a received image may include a person in front of the Eiffel Tower. In this example, ICM 104 may use a first reference image to compress a portion of the received image containing the person or person's face and ICM 104 may use a second, different reference image to compress the portion of the received image containing the Eiffel Tower and/or the rest of the scene.

In some embodiments, compressing an image may include compressing the image using a video compression technique or algorithm, e.g., an H.262 codec, an H.263 codec, an H.264 codec, an H.265 codec, an MPEG-4 codec, an MPEG-2 codec, a VP6 codec, a VP7 codec, a VP8 codec, a VP9 codec, and/or another codec or technique.

It should be noted that node(s) 102, ICM 104, and/or functionality described herein may constitute a special purpose computing device (e.g., an image compression system). Further, node(s) 102, ICM 104, and/or functionality described herein can improve the technological field of image compression by providing mechanisms for representing images as high-dimensional points using binarized GIST descriptors and for quickly identifying visually similar photos within a canonical set of millions of images using the binarized GIST descriptors. As such, various techniques described herein can provide competitive compression rates and can identify and remove duplicate pixel information at significantly higher speeds that enable online operation of an image compression system at cloud-scale.

The disclosure of each of the following references is incorporated herein by reference in its entirety.

REFERENCES

[1] Samy Ait-Aoudia and Abdelhalim Gabis. A Comparison of Set Redundancy Compression Techniques. *EURASIP J. Appl. Signal Process.*, 2006:216-216, January 2006. ISSN 1110-8657. doi: 10.1155/ASP/2006/92734. URL http://dx.doi.org/10.1155/ASP/2006/92734.

[2] A. Andoni and P. Indyk. Near-Optimal Hashing Techniques For Approximate Nearest Neighbor In High Dimensions. In Foundations of Computer Science, 2006. FOCS '06. 47th Annual IEEE Symposium on, pages 459-468, October 2006. doi: 10.1109/FOCS. 2006.49.

[3] Carl Doersch, Saurabh Singh, Abhinav Gupta, Josef Sivic, and Alexei A Efros. What Makes Paris Look Like Paris? In *ACM Transactions on Graphics (SIGGRAPH)*, volume 31, page 101. ACM, 2012.

[4] Matthijs Douze, Hervé Jégou, Harsimrat Sandhawalia, Laurent Amsaleg, and Cordelia Schmid. Evaluation of Gist Descriptors For Web-Scale Image Search. In *Proceedings of the ACM International Conference on Image and Video Retrieval*, CIVR '09, pages 19:1-19:8, New York, N.Y., USA, 2009. ACM. ISBN 978-1-60558-480-5. doi: 10.1145/1646396.1646421. URL http://doi.acm.org/10.1145/1646396.1646421.

[5] Jan-Michael Frahm, Pierre Fite-Georgel, David Gallup, Tim Johnson, Rahul Raguram, Changchang Wu, Yi-Hung Jen, Enrique Dunn, Brian Clipp, Svetlana Lazebnik, and Marc Pollefeys. Building Rome On a Cloudless Day. In Kostas Daniilidis, Petros Maragos, and Nikos Paragios, editors, Computer Vision âĂŞ, ECCV 2010, volume 6314 of *Lecture Notes in Computer Science*, pages 368-381. Springer Berlin Heidelberg, 2010. ISBN 978-3-642-15560-4. doi: 10.1007/978-3-642-15561-1_27. URL http://dx.doi.org/10.1007/978-3-642-15561-1_27.

[6] James Hays and Alexei A. Efros. Scene Completion Using Millions of Photographs. In *ACM SIGGRAPH 2007 Papers*, SIGGRAPH '07, New York, N.Y., USA, 2007. ACM. doi: 10.1145/1275808.1276382. URL http://doi.acm.org/10.1145/1275808.1276382.

[7] James Hays and Alexei A. Efros. Im2gps: Estimating Geographic Information from a Single Image. In *IEEE Conference on Computer Vision and Pattern Recognition*, pages 1-8, 2008.

[8] Yang Lu, Tien-Tsin Wong, and Pheng-Ann Heng. Digital Photo Similarity Analysis In Frequency Domain And Photo Album Compression. In *Proceedings of the 3rd International Conference on Mobile and Ubiquitous Multimedia*, MUM '04, pages 237-244, New York, N.Y., USA, 2004. ACM. ISBN 1-58113-981-0. doi: 10.1145/1052380.1052413. URL http://doi.acm.org/10.1145/1052380.1052413.

[9] P. K. Meher, Sang Yoon Park, B. K. Mohanty, Khoon Seong Lim, and Chuohao Yeo. Efficient Integer DCT Architectures For HEVC. *Circuits and Systems for Video Technology, IEEE Transactions on*, 24(1):168-178, January 2014. ISSN 1051-8215. doi: 10.1109/TCSVT.2013.2276862.

[10] John Nickolls, Ian Buck, Michael Garland, and Kevin Skadron. Scalable Parallel Programming With Cuda. *Queue*, 6(2):40-53, March 2008. ISSN 1542-7730. doi: 10.1145/1365490.1365500. URL http://doi.acm.org/10.1145/1365490.1365500.

[11] Aude Oliva and Antonio Torralba. Modeling the Shape of the Scene: A Holistic Representation of the Spatial Envelope. *International Journal of Computer Vision*, 42(3):145-175, 2001. ISSN 0920-5691. doi: 10.1023/A:1011139631724. URL http://dx.doi.org/10.1023/A%3A1011139631724.

[12] Maxim Raginsky and Svetlana Lazebnik. Locality-Sensitive Binary Codes from Shift-Invariant Kernels. In Yoshua Bengio, Dale Schuurmans, John D. Lafferty, Christopher K. I. Williams, and Aron Culotta, editors, *NIPS*, pages 1509-1517. Curran Associates, Inc., 2009. ISBN 9781615679119. URL http://dblp.uni-trier.de/db/conf/nips/nips2009.html#RaginskyL09.

[13] Rahul Raguram, Changchang Wu, Jan-Michael Frahm, and Svetlana Lazebnik. Modeling and Recognition of Landmark Image Collections Using Iconic Scene Graphs. *Int. J. Comput. Vision*, 95(3):213-239, December 2011. ISSN 0920-5691. doi: 10.1007/s11263-011-0445-z. URL http://dx.doi.org/10.1007/s11263-011-0445-z.

[14] Omar Shahine. Over 250 m People Using Skydrive, May 2013. URL http://blog.onedrive.com/over-250 m-people-using-skydrive/.

[15] T. Shanableh, E. Peixoto, and E. Izquierdo. MPEG-2 to HEVC Video Transcoding with Content-based Modeling. *Circuits and Systems for Video Technology, IEEE Transactions on*, 23(7):1191-1196, July 2013. ISSN 1051-8215. doi: 10.1109/TCSVT.2013.2241352.

[16] Zhongbo Shi, Xiaoyan Sun, and Feng Wu. Photo Album Compression For Cloud Storage Using Local Features. *Emerging and Selected Topics in Circuits and Systems, IEEE Journal on*, 4(1):17-28, March 2014. ISSN 2156-3357. doi: 10.1109/JETCAS.2014.2298291.

[17] Cooper Smith. Facebook Users Are Uploading 350 Million New Photos Each Day, September 2013. URL http://www.businessinsider.com/facebook-350-million-photos-each-day-2013-9.

[18] Gary J. Sullivan, Jens-Rainer Ohm, Woojin Han, and Thomas Wiegand. Overview of the High Efficiency Video Coding (HEVC) Standard. *IEEE Trans. Circuits Syst. Video Techn.*, 22(12):1649-1668, 2012. URL http://dbl-p.uni-trier.de/db/journals/tcsv/tcsv22.html#SullivanOHW12.

[19] Gregory K. Wallace. The jpeg still picture compression standard. *Commun. ACM*, 34 (4):30-44, April 1991. ISSN 0001-0782. doi: 10.1145/103085.103089. URL http://doi.acm.org/10.1145/103085.103089.

[20] Chi-Ho Yeung, O. C. Au, Ketan Tang, Zhiding Yu, Enming Luo, Yannan Wu, and Shing-Fat Tu. Compressing Similar Image Sets Using Low Frequency Template. In *Multimedia and Expo (ICME), 2011 IEEE International Conference on*, pages 1-6, July 2011. doi: 10.1109ICME.2011.6011954.

[21] Huanjing Yue, Xiaoyan Sun, Jingyu Yang, and Feng Wu. Cloud-Based Image Coding For Mobile Devices 2014—Toward Thousands to One Compression. *Multimedia, IEEE Transactions on*, 15(4):845-857, June 2013. ISSN 1520-9210. doi: 10.1109/TMM.2013.2239629.

[22] Ruobing Zou, O. C. Au, Guyue Zhou, Wei Dai, Wei Hu, and Pengfei Wan. Personal Photo Album Compression And Management. In *Circuits and Systems (ISCAS), 2013 IEEE International Symposium on*, pages 1428-1431, May 2013. doi: 10.1109/ISCAS.2013.6572124.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing image compression, the method comprising:
   identifying a canonical image set from a plurality of images uploaded to or existing on a cloud computing environment and/or a storage environment;
   computing an image representation for each image in the canonical image set;
   receiving a first image;
   identifying, using the image representations for the canonical image set, one or more reference images that are visually similar to the first image, wherein identifying the one or more reference images includes: computing a first image representation for the first image, compressing the first image representation using a binarizing process, and performing, using the first image representation, a k-nearest neighbor(s) (KNN) search over the image representations for the canonical image set, wherein each of the image representations includes a GIST descriptor represented as a binarized string; and
   compressing the first image using the one or more reference images.

2. The method of claim 1 wherein the canonical image set includes images uploaded by or belonging to different users.

3. The method of claim 2 wherein identifying the canonical image set includes randomly sampling images uploaded by or belonging to the different users.

4. The method of claim 1 wherein each of the image representations includes attributes for color, texture, shape, motion, or location associated with a depicted scene.

5. The method of claim 1 wherein the canonical image set includes one or more compressed images.

6. The method of claim 1 wherein computing the image representation for each image in the canonical image set includes computing an image representation for each image in the canonical image set prior to identifying the one or more reference images.

7. The method of claim 1 wherein compressing the first image includes compressing the first image using a video compression algorithm.

8. The method of claim 1 wherein compressing the first image includes compressing the first image using a first reference image to compress a first portion of the first image and using a second reference image to compress a second portion of the first image.

9. The method of claim 1 comprising growing the canonical image set by adding the first image if the compression ratio of the first image is below a threshold.

10. A system for performing image compression, the system comprising:
    a memory; and
    an image compression module (ICM) implemented using a memory, the ICM configured to identify a canonical image set from a plurality of images uploaded to a cloud computing environment and/or a storage environment, to compute an image representation for each image in the canonical image set, to receive a first image, to identify, using the image representations for the canonical image set, one or more reference images that are visually similar to the first image, wherein identifying the one or more reference images includes: computing a first image representation for the first image, compressing the first image representation using a binarizing process, and performing, using the first image representation, a k-nearest neighbor(s) (KNN) search over the image representations for the canonical image set, wherein each of the image representations includes a GIST descriptor represented as a binarized string, and to compress the first image using the one or more reference images.

11. The system of claim 10 wherein the canonical image set includes images uploaded by or belonging to different users.

12. The system of claim 11 wherein the ICM is configured to identify the canonical image set by randomly sampling images uploaded by or belonging to the different users.

13. The system of claim 10 wherein each of the image representations includes attributes for color, texture, shape, motion, or location associated with a depicted scene.

14. The system of claim 10 wherein the canonical image set includes one or more compressed images.

15. The system of claim 10 wherein the ICM is configured to compute the image representation for each image in the canonical image set prior to identifying the one or more reference images.

16. The system of claim 10 wherein the ICM is configured to compress the first image using a video compression algorithm.

17. The system of claim 10 wherein the ICM is configured to compress the first image using a first reference image to compress a first portion of the first image and using a second reference image to compress a second portion of the first image.

18. The system of claim 10 wherein the ICM is configured to grow the canonical image set by adding the first image if the compression ratio of the first image is below a threshold.

19. A non-transitory computer readable medium having stored thereon executable instructions that when executed by a processor of a computer control the computer to perform steps comprising:
    identifying a canonical image set from a plurality of images uploaded to or existing on a cloud computing environment and/or a storage environment;
    computing an image representation for each image in the canonical image set;
    receiving a first image;
    identifying, using the image representations for the canonical image set, one or more reference images that are visually similar to the first image, wherein identifying the one or more reference images includes: computing a first image representation for the first image, compressing the first image representation using a binarizing process, and performing, using the first image representation, a k-nearest neighbor(s) (KNN) search over the image representations for the canonical image set, wherein each of the image representations includes a GIST descriptor represented as a binarized string; and
    compressing the first image using the one or more reference images.

* * * * *